United States Patent

[11] 3,601,004

| [72] | Inventor | Yasuo Oshiro<br>99-138 A Waipao Place, Aiea, Hawaii 96701 |
|---|---|---|
| [21] | Appl. No. | 853,457 |
| [22] | Filed | Aug. 27, 1969 |
| [45] | Patented | Aug. 24, 1971 |

[54] COMBINATION OF A ROUTER AND JOINTER
4 Claims, 6 Drawing Figs.

[52] U.S. Cl.................................................. 90/12, 144/134 D
[51] Int. Cl.................................................. B23c 1/20, B27c 5/10
[50] Field of Search........................................... 144/70, 134 (-5), 134 (-1), 134, 136 (-3), 117 (-2), 117 (-5); 90/12, 11

[56] References Cited
UNITED STATES PATENTS

| 1,706,157 | 3/1929 | Hannah | 144/117 (-5) X |
| 2,839,107 | 6/1958 | Emmons | 144/134 (-5) X |
| 3,185,470 | 5/1965 | Zitner | 144/134 X |

*Primary Examiner*—Gil Weidenfeld
*Attorney*—Earl E. Moore

ABSTRACT: The combination of a router and jointer which is so arranged that the cutter thereof is aligned with the joint line of a pair of base plates which is coupled together for sliding relationship; and wherein the movable plate is microadjustable with the cutter.

Patented Aug. 24, 1971
3,601,004
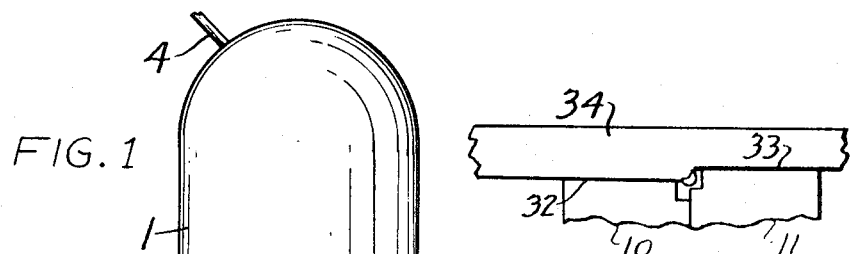
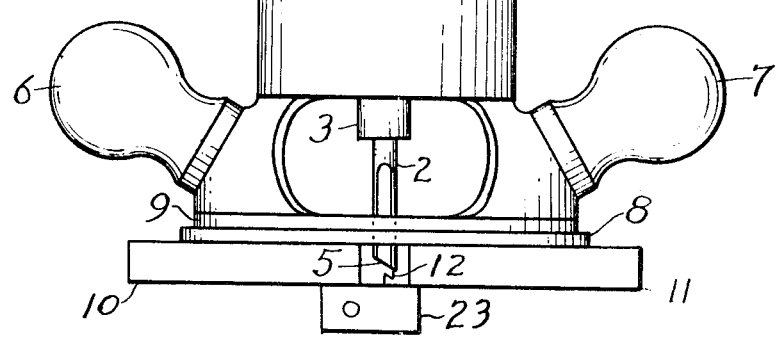
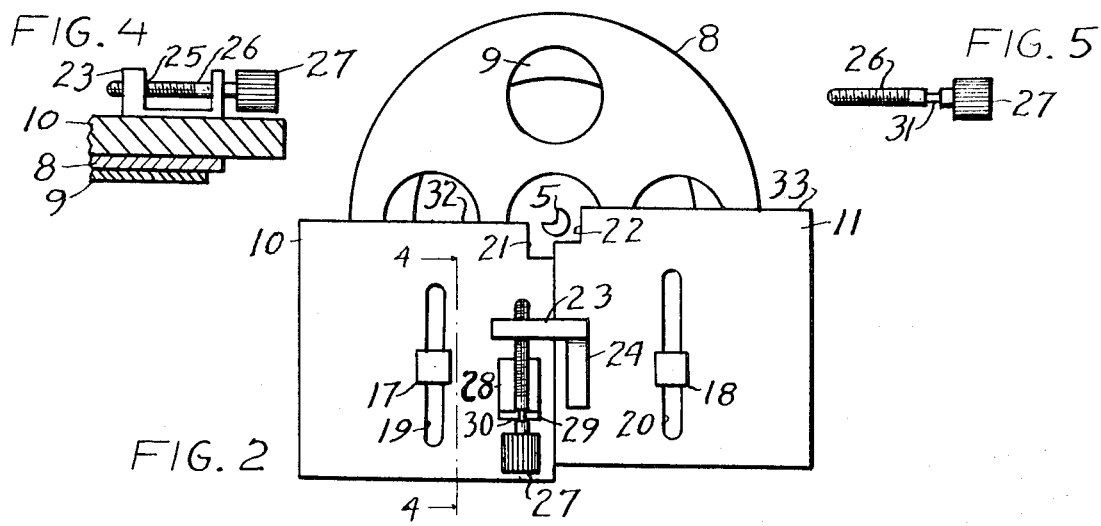
INVENTOR
YASUO OSHIRO
Earl E Moore
ATTORNEY

COMBINATION OF A ROUTER AND JOINTER

This invention relates to means and ways of treating material for joining purposes and the like and includes the combination of an accessory or auxiliary jointer device with a router machine. A router machine is a motor-driven unit having a revolving vertical spindle with a cutter means for milling the edges of material. It aids in making fittings of strips, etc., and the mating of them, and is especially useful for joining various parts in the building of shelves, panels, ledges, cabinets, etc.

The combination is of lightweight and very handy to carpenters, model makers, and especially, because of the speed of the cutter, things can be neatly and smoothly cut and this includes laminates and such materials known as "Micarta," "Formica," and "Textolite."

One of the principal objects and aims of this invention is to provide a jointer guide means in combination with the base portion of a router and similar machines, and especially the relatively small portable types.

Another object is to present a jointer guide and router combination which is adjustable and adapted for use with typical router machines that are portable.

Still another object is to provide a jointer guide and the like for routers wherein the device is simple and economical to make and manufacture and which is easy to adjust and maintain.

Other objects of this invention can be learned by perusing the drawings, specifications and claims.

In the drawings:

FIG. 1 is an elevational view of the jointer-guide and router machine combination;

FIG. 2 is a bottom plan view of the combination;

FIG. 3 is an elevational view of a portion of the base of the router showing how the jointer-guide is attached thereto, the view is taken on the opposite side of the combination as shown in FIG. 1;

FIG. 4 is an elevational view with parts in section taken substantially along the line 4—4 of FIG. 2;

FIG. 5 is an elevational view of a screw per se;

FIG. 6 is a partial view of FIG. 2 on a smaller scale indicating how the invention can be used.

One form of the invention as shown in the drawings, all like parts are designated by the same reference character.

The number 1 indicates the power section of a router unit which houses the electric motor and necessary moving parts for rotating the spindle-type cutter 2 which is shown clamped in the chuck means 3. An insulated cable means 4 carries electric current of suitable voltage to the electric motor from a suitable source of supply. The spindle has the well-known triangular cutting end portion 5, but it is obvious that other kinds of cutters may be employed. The router has the usual handgrips 6 and 7 and the bottom circular baseplates 8 nd 9 to which the invention is attached. The baseplates have various openings to lighten the weight of the router and this is common practice in such machines.

The auxiliary attachment to the router comprises a pair of relatively thick guide plates 10 and 11 which are dovetailed together as indicated at 12 with sufficient free play or sliding connection so that the plates can be shifted individually. The bolts or screws 13 and 14 hold the guide plates 11 and 10 respectively in place but allows them to be shifted along the base 8 when the wingnuts 15 and 16 are loosened. Note, that the bolts have squared head 17 and 18 which are countersunk into their respective guide plates to prevent the bolts turning when the wingnuts are loosened or tightened. Each bolt passes through its respective slot means 19 or 20 and these slots allow the plates to be shifted to various positions to and from the cutter means 5. These plates have notched portions 21 and 22 to provide a clearance opening for the cutter's operation.

With special reference to FIGS. 2 and 4, the adjustable means for shifting the guide plates 10 and 11 will now be explained:

An arm 23 is provided which is perpendicular to the guide plate 10 but slightly spaced therefrom and supported by a leg means 24 that is firmly fixed to the guide plate 11 by any suitable means such as by welding or brazing when the parts are made of a suitable metal. Bolts and screws may be employed if desired. All the materials of this invention may be of metal, plastics, wood, etc., depending upon cost of materials, etc. The portion of the arm that extends over the guide plate 10 is provided with a threaded bore 25. This bore receives in mesh relationship one end of a threaded stem or screw 26 which has the thumb or finger operating grip means 27 integral therewith. This grip is knurled to avoid slippage.

Fixed to the guide plate 10 there is a bracket means having a leg or flange 28 that is provided with an upstanding saddle plate or slotted bearing member 29 wherein the slot is indicated at 30. This slot is sized to neatly receive and journal the reduced portion 31 of the screw 26 so as to allow the screw to be rotated but not to be shifted along the guide plate 10. By this construction, rotation of the grip 27 will cause the shifting of the plate 10 along the dovetailed edge of plate 11 so as to vary the relative positions of the plate notches 21 and 22 and of course the cutter edges of the plate.

By varying the positions of the plates or guides 10 and 11, the edge 32 and 33 thereof are made to be in alignment if desired, or out of alignment depending upon the routing action to be made upon a strip of material indicated at 34, note FIG. 6. The cut of the strip 34, for instance, is determined upon the relative placement of the guide plates 10 and 11 and if necessary several adjustments and cuts may be made by adjusting the screw knob 27. The strips may be cut before or after placement to the thing being worked on or already installed.

Certain novel features and details of this invention are disclosed herein, and in some cases in considerable detail, and this is in order to make the invention clear in at least one form thereof. However, it is to be clearly understood that the invention as disclosed is not necessarily limited to the exact form and details disclosed since it is apparent that various modifications ad changes may be made without departing from the spirit and scope of the invention as described and claimed.

Having thus described my invention, what is claimed and believed new and which is desired to be secured by Letters Patent is:

I claim:

1. In combination, a routing machine including a cutter means and a base, an adjustable guide means attached to the base which provides guiding edge means along the guide means to direct a workpiece to the cutter means, the guide means comprising a pair of mutually sliding plates having opposed openings about the cutter means, one plate having means fixed thereto with an arm extending over the other plate, and the other plate having means for shifting the arm so as to move the said one plate to and from the location of the cutter means in small increments.

2. The combination recited in claim 1 wherein the guide means comprises a pair of mutually sliding plates with the line of their meeting in alignment with the cutter means, each plate having an opening about the cutter means, one plate having an arm extending therefrom, and means on the other plate for shifting the arm and thence the said one plate.

3. The combination recited in claim 1 wherein the guide means comprises a pair of mutually slidable plates with the line of their contact in substantial alignment with the cutter means, each plate having an opening about the cutter means, one plate having an arm extending therefrom and over a portion of the other plate, a screw means held to the other plate and which screw means is meshed with a threaded bore in the said arm so that the screw means can move the said other plate to and from the cutter means.

4. The combination recited in claim 2 wherein the screw means has a knurled finger grip fixed thereto and the plates are dovetailed together along their line of contact with one another.